Dec. 2, 1952 — H. A. GILLERSTROM — 2,620,195
VALVE FOR PNEUMATIC COLUMNS
Filed Nov. 12, 1948 — 2 SHEETS—SHEET 1

INVENTOR
HILMER A. GILLERSTROM
BY
ATTORNEY

Dec. 2, 1952     H. A. GILLERSTROM     2,620,195
VALVE FOR PNEUMATIC COLUMNS
Filed Nov. 12, 1948     2 SHEETS—SHEET 2
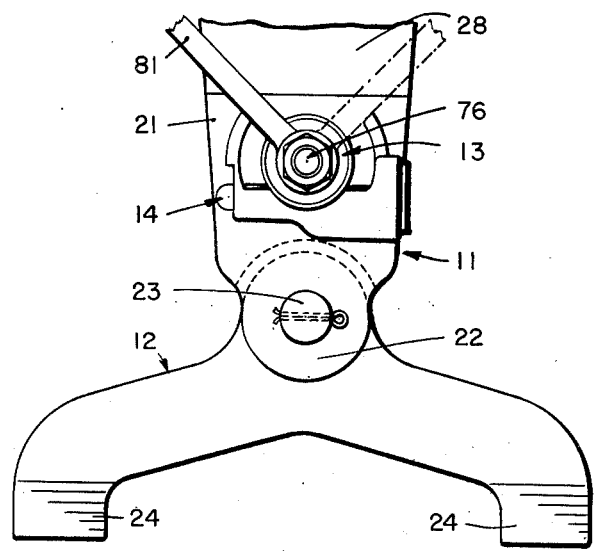
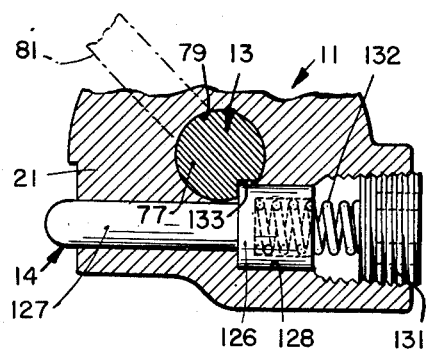
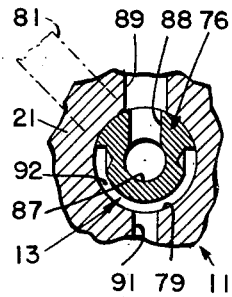
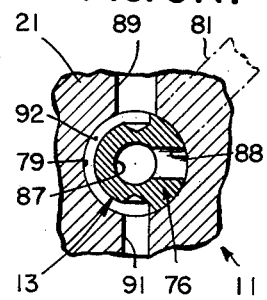
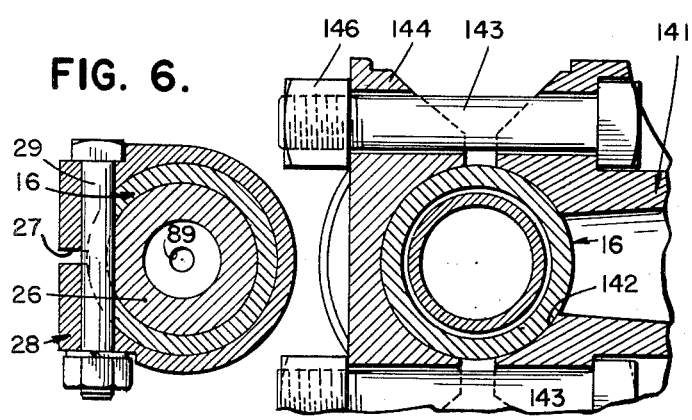
INVENTOR
HILMER A. GILLERSTROM
BY
ATTORNEY

Patented Dec. 2, 1952

2,620,195

UNITED STATES PATENT OFFICE 2,620,195

VALVE FOR PNEUMATIC COLUMNS

Hilmer A. Gillerstrom, Arcadia, Calif., assignor to Independent Pneumatic Tool Co., Chicago, Ill., a corporation of Delaware Application November 12, 1948, Serial No. 59,645

2 Claims. (Cl. 277—64)

The present invention relates to pressure expanded columns in general and particularly to a pneumatic column useful in mining operations. More specifically the invention comprises an extensible column adapted to be locked in position between mine floor and ceiling by air pressure and to serve, when so positioned, as the support for drillers' tools.

Mining operations require the use of heavy pneumatically operated drills which are, in many forms, too large and heavy for the driller to carry and accordingly are mounted upon supports built near the work. The forces exerted and the loads present are relatively great and these supports are large and heavy. Appreciable time is lost in setting them up and in moving them from place to place.

The pneumatic column constructed in accordance with the present invention is an extensible telescopic member which can be positioned easily between floor and ceiling and locked in place by air pressure. The construction is such that it is unnecessary to retain the connection between the column and the source of air pressure, air leakage being prevented by an improved arrangement in which the internal air pressure cooperates to provide a positive seal. It is extremely important that the pressurized air be admitted readily to the unit so that it can be positioned quickly, and it is just as important that when in position the pressure shall not be accidentally released. Such release would permit the unit to collapse and the heavy tools supported thereon to fall, resulting not only in loss of time but also in possible damage to machinery and injury to drillers.

With an appreciation of the problems characterizing drilling operations in mining and of the difficulties and shortcomings of the tool-supporting arrangements which have heretofore been used in connection with drills it is an object of the present invention to provide a new and improved pneumatic column adapted to be extended and wedged between floor and ceiling to enable it to perform a tool-supporting function.

It is another object of the invention to provide a new and improved operator controlled pneumatic column designed to extend between ceiling and floor in a mine and to support tools used in the mining operation.

A still further object of the invention is to provide a pneumatic column including telescoping extensible elements adapted to be elongated by air pressure and to retain that pressure without leakage.

Still another object of the invention is to provide a pneumatic air column incorporating improved air-controlling means which prevent accidental release of air.

A further object of the invention is to provide a pneumatic air column adapted for use in atmospheres carrying suspended foreign particles and which includes an air pressure actuated piston slidable in sealed relationship in an enclosing cylinder in combination with cylinder-cleaning means to protect the piston from contact with adherent foreign matter.

These and other more specific objects will appear upon reading the following specification and claims and upon considering in connection therewith the attached drawings to which they relate.

Referring now to the drawings in which a preferred embodiment is illustrated:

Figure 3 is a partial side view looking in the direction of the arrows upon the line 3—3 of Figure 2 and illustrates the column foot pivoted to the base and the end positions of the operator-controlled valve;

Figure 4 is a partial section upon the line 4—4 of Figure 2 through the manually operable throttle lock;

Figure 5 is a section through the throttle valve upon the line 5—5 of Figure 2, the valve being positioned to direct air into the cylinder to expand the column;

Figure 5A is a view similar to Figure 5 but with the valve rotated to enable air to escape from the column cylinder;

Figure 6 is a transverse section upon the line 6—6 of Figure 2 and illustrates the collar by which the base and the column are locked;

Figure 7 is a section upon the line 7—7 of Figure 1 through the adjustable clamping seat by which the tool-supporting arm is held to the column.

Figure 2:
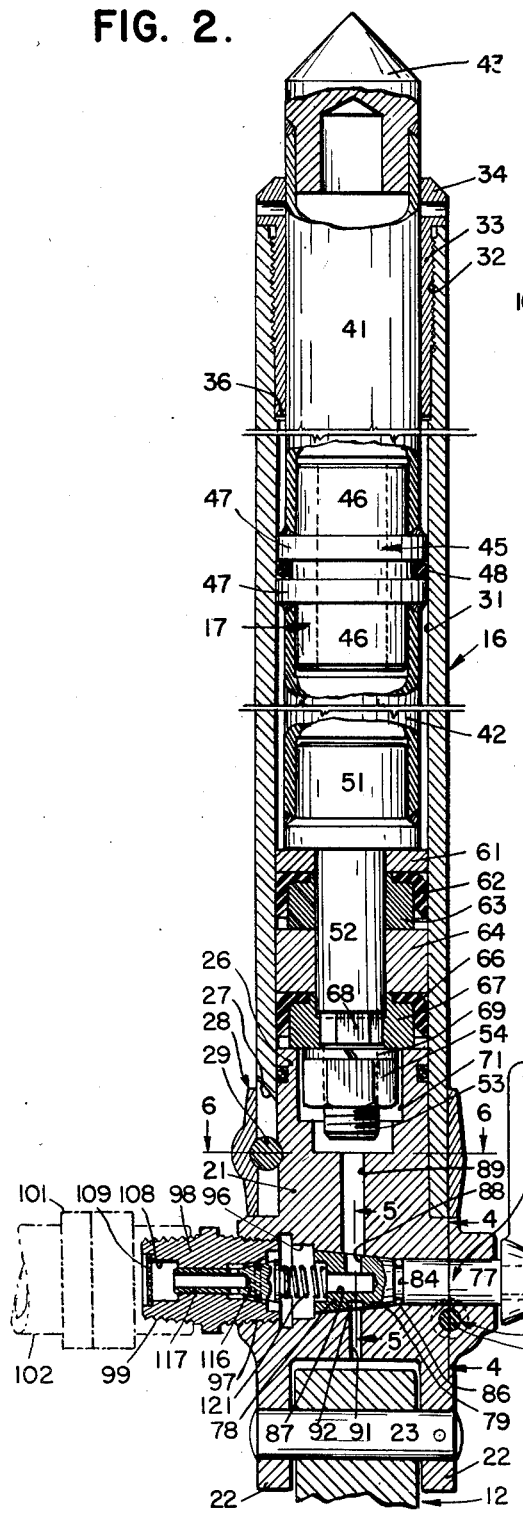
Figure 2 is an elongated vertical section through the column of Figure 1.
Figure 8:
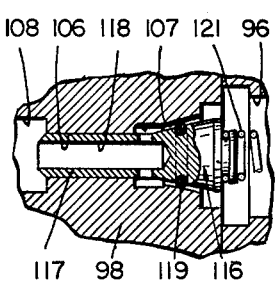
Figure 8 is an enlarged showing of the check valve construction.

The pneumatic column embodying the present invention is illustrated in a preferred embodiment in the drawings and includes the following important parts, each of which is generally indicated by the reference character referred to. A base 11 has pivoted to its lower end a column foot 12 and seats the throttle valve unit 13 which is held releasably in certain of its positions by the throttle lock 14. The column cylinder 16 housing the piston rod unit 17 extends from the base 11 upon the opposite side from the column foot 12 and adjustably supports a tool-supporting arm 18. The specific construction of these parts will now be discussed in detail.

The column base, generally indicated by the reference character 11, comprises a solid metallic body 21 from the lower end of which extends a spaced pair of parallel ears 22 connected by a pivot pin 23. The latter serves as a pivotal connection for the column foot, generally indicated by the reference character 12, which includes a spaced pair of surface-contacting elements 24.

From the side of the base body 21 opposite the column foot 12 extends a cylindrical seat portion 26 enclosed by and seating the inner end of the elongated column cylinder, generally indicated by the reference character 16. The latter is longitudinally slotted at 27 where it encloses base portion 26 and is encircled there by a split collar 28 the ends of which are drawn together by a bolt 29 to clamp the cylinder tightly upon its seat 26. As is shown clearly in Figure 6 the seat of bolt 29 is formed in part by cylinder 16 and by base cylindrical portion 26 to prevent relative rotation. The length of cylinder 16 is a variable and depends upon the field of intended use of the unit. In certain standard sizes its length varies between approximately five and approximately nine feet. Its interior surface 31 is smooth-finished as to serve suitably as the bore for the piston rod unit 17 longitudinally slidable therein, and its outer end is threaded at 32 to seat removably the externally threaded rod bearing 33, the exterior end of which is enlarged at 34 to abut the end of the cylinder and the interior end 36 of which functions as a stop for unit 17.

The piston rod unit, generally indicated by the reference character 17, is positioned within cylinder 16 for longitudinal displacement toward and from base 11. It is built up of a plurality of aligned rigidly connected parts, the major portion of its length being provided by a pair of aligned hollow rods or tubes 41 and 42 spaced radially inwardly from the inner surface 31 of cylinder 16. Outer rod 41 slides in column bearing 33 and at its outer end seats the conical rod point 43 adapted to force its way under pressure into a contacted ceiling. The opposed ends of rods 41 and 42 are fixed to a piston rod guide, indicated generally by the reference character 45, which comprises reduced ends 46 seated permanently within the rods 41 and 42 and a pair of spaced enlarged cylindrical flanges 47 which make sliding contact with interior surface 31 of cylinder 16 and seating between them a sealing O ring 48. The inner end of rod 42, that end nearest base 11, seats the enlarged body of an extension member 51 which includes an elongated shaft 52 of reduced diameter threaded at its inner end at 53 and seating a nut 54. Between its enlarged body and the nut 54 the shaft 52 of extension member 51 seats, in the following order, a packing ring 61, a seal 62, a spacer member 63, the piston proper 64, a seal 66 and a spacer member 67. Tightening the nut 54 on shaft 52 forces the aforementioned parts, which may be broadly termed the piston unit, against the enlarged head of extension member 51 so that the seals 62 and 66 make fluid-tight sliding contact with the enclosing cylindrical wall 31. To prevent rotation of spacer 67 that element is interiorly non-circular and conforms to the section of that portion of shaft 52 which it surrounds, as illustrated at 68. Additionally, a spring lock washer 69 is provided immediately adjacent nut 54 to prevent its accidental displacement. As is best illustrated in Figure 2, piston rod unit 17 in its innermost position rests against the end of cylindrical seat portion 26 of base 11, the adjacent spacer member 67 contacting the end of portion 26. This places the end of shaft 52 and nut 54 within a counterbored enlarged opening 71 formed in the body 21 to receive it and, as it is open to the interior of cylinder 16, it constitutes, as will be apparent, the port through which air under pressure enters that member in order to force the piston rod unit 17 outwardly to its extended position.

The flow of air under pressure into cylinder 16 is controlled by a throttle valve unit, generally indicated by the reference character 13, and located in base 11. The valve proper bears the reference character 76 and includes a cylindrical stem 77 and a frusto conical portion 78 seated within a similarly shaped valve seat 79 in base body 21. Stem 77 extends outside body 21 and carries the valve lever 81 secured in place by a nut 82 seated on its threaded end 83. Between its ends stem 77 is circumferentially grooved at 84 and seats an enclosing O ring 86 providing an air seal to prevent the leakage of air past the stem. The conical inner end of the valve is formed with a longitudinal bore 87 open at its outer end. A transverse intersecting conduit 88 leads from bore 87 and is positioned as to open to a conduit 89 extending in base body 21 between the cylinder port 71 and valve seat 79. A second diametrically opposed conduit 91 connects the interior of valve seat 79 to the ambient atmosphere between the base body ears 22 and is adapted to be connected to cylinder-connected conduit 89 by a circumferentially extending groove 92 formed in the conical portion 78 of valve 76. In Figure 5 the central valve passage 87 is shown connected to conduit 89 leading to port 71 of cylinder 16 and in Figure 5A the valve is shown rotated through ninety degrees so that conduit 89 is connected to exhaust conduit 91 in order that air from the cylinder 16 can make its escape to atmosphere.

Adjacent the inner end of valve 76 in base body 21 is an enlarged chamber 96 opening to the exterior through the body and threaded at 97. An air inlet spud 98 seats threadedly in the open side of chamber 96 and is itself exteriorly threaded at 99 to seat removably a conventional connector 101 at the end of an air supply hose 102. A longitudinal passage 106 in spud 98 connects enlarged inner and outer end chambers 107 and 108, respectively. The former is conical, its enlarged open end facing base chamber 96. Outer chamber 108 is covered by a foraminous screen 109 to prevent the entrance of foreign material entrained in the air stream. A check valve 116 is positioned in spud 98 with its conical head within conical chamber 107 and its cylindrical stem 117 slidingly positioned in passage 106. A longitudinal bore 118 in stem 117 extends from chamber 108 and connects by transverse extensions at its opposite end to the smaller end of conical chamber 107. The conical head of check valve 116 is circumferentially grooved and carries a sealing O ring 119, and when the valve 116 is seated, as by the pressure of the air within chamber 96, the escape of air outwardly through the spud is prevented. A coil spring 121 abuts the recessed inner end of valve 76 and seats upon the inner end of check valve 116 to hold the latter normally in closed position. The force exerted by spring 121 is such, however, that air under pressure from a conduit 102 attached to spud 98 can force the check valve 116 inwardly to open position. That air upon entering the chamber 96 can make its way through the valve passages 87 and 88 and thence to conduit 89 and to the inner end of cylinder 16, valve 76 being positioned as illustrated in Figures 2 and 5.

It is extremely important that valve 76 should not accidentally be moved from intake to exhaust position with the unit in operation. Such movement would permit the air under pressure holding the column extended to escape whereupon the latter would collapse. To prevent such an occurrence there is provided a throttle lock, indicated generally by the reference character 14, and illustrated most clearly in Figures 2, 3 and 4. The lock is seen to comprise an elongated bolt including a cylindrical head 126 from which extends a reduced shank or stem 127. The bolt is slidable in base body 21 in a transverse counterbored passage 128 intersecting at the inner end of its enlarged portion the valve seat 79. A coil spring 132 seats in the recessed inner end of bolt head 126 and at its opposite end abuts the plug 131 to exert a force at all times urging the bolt head into intersecting relationship with the valve seat 79, as illustrated in Figure 4. As is there shown, the valve stem 77 is formed with a cut-out seat 133 to receive the edge of the bolt head so that rotation of the valve in a clockwise direction, that is, from intake to exhaust position, is positively prevented. In its locking position the outer end of bolt stem 127 extends beyond the base body 21 and is adapted to be pressed inwardly by the operator to release the valve.

The primary function of the pneumatic column is to support working tools and better to enable it to accomplish this function there is provided a laterally extending work supporting arm unit 18. Unit 18 includes a rigid arm member 141 which may be hollow if desired and which at its inner end is curved at 142 partially to encircle cylinder 16 so that it may be clamped thereagainst by a pair of clamping bolts 143, the opposite ends of which extend through a cooperating clamping bracket 144. Only one of the clamping bolts 143 is illustrated, but they are to be understood to be duplicated upon opposite sides of cylinder 16, and in each instance the tightening of the nut 146 at the end thereof draws the arm and the bracket 144 into clamping relationship with the cylinder, it being necessary only to loosen the nut in order to adjust the arm angularly or vertically to any desired position. The use and operation of the pneumatic column constructed in accordance with the present invention is as follows. The column is positioned at the desired location with the foot 12 resting upon the supporting floor surface. The pivotal connection of the foot at the pin 23 with the base 11 makes possible its angular adjustment to conform to irregularities in the floor. The air supply conduit, indicated in the drawings by the reference character 102, is then connected by its nipple 101 to the threaded spud 98 and lever or handle 81 of valve 76 is turned to the open position so that its center passage 87 leading from the chamber 96 connects to the conduit 89 leading to the port 71 at the inner end of cylinder 16. If the air pressure is then turned on the air enters the spud 98 through the screen 109, which removes any suspended foreign material, and exerts its pressure against the check valve 116 to move that member inwardly against the opposing action of coil spring 121. The air may then enter chamber 96, the seal of the sealing ring 119 with the enclosing conical chamber 107 in the spud being broken by the displacement of the check valve. Air under pressure in chamber 96 then traverses valve 76 and passes through conduit 89 to enter cylinder 16 at the inner end of the piston rod unit 17. The presence of the piston 64 and of the seals 62 and 66 prevents the passage of the air and the entire piston rod unit 17 is forced upwardly. The rod point 43 at the upper end of unit 17 advances toward the ceiling to make contact therewith and to be forced therein. During its upward travel the piston rod unit is supported not only at the piston 64 and the seals 62 and 66 but also by the guide 45 carrying the sealing O ring 48. The guide not only complements the piston proper 64 as an air seal to retain the air under pressure but also performs the function of a scraper to remove and clean from the cylinder wall 31 adherent foreign materal to prevent wear in the piston proper and its adjacent seals.

The extent of the elongation of the unit depends upon the height of the ceiling above the supporting floor and once the rod point 43 is firmly seated in the ceiling the air pressure only serves to hold the column in place. According to the present invention it is not necessary to retain the air supply conduit in place and instead it may be removed, the pressure of the air in the chamber 96 in body 21 cooperating with the coil spring 121 to force the conical head of check valve 116 tightly against its conical seat so that the sealing O ring 119 provides a positive seal to prevent air leakage. Similarly, air cannot escape in the opposite direction and around the stem 77 of the valve 76 because of the presence of the encircling sealing O ring 86 at that point.

With the pneumatic column positioned as described the worker may adjust the tool-supporting unit 18 to the proper angular position and height simply by loosening the nuts 146 at the cylinder end thereof, positioning the arm unit, and again tightening the nuts. During use the accidental escape of the air under pressure from within cylinder 16 is positively prevented by the locking action of throttle lock 14. Under the action of the coil spring 132 the cylindrical head 126 of the locking bolt extends into the notched seat 133 in the valve stem 77 with the valve positioned in its open position as illustrated in Figure 4, and it is clearly impossible to rotate the valve clockwise as is necessary in the adjustment of the valve to permit of the escape of the air to atmosphere, that is, from the angular position of Figure 5 to that of Figure 5A.

Figure 1:
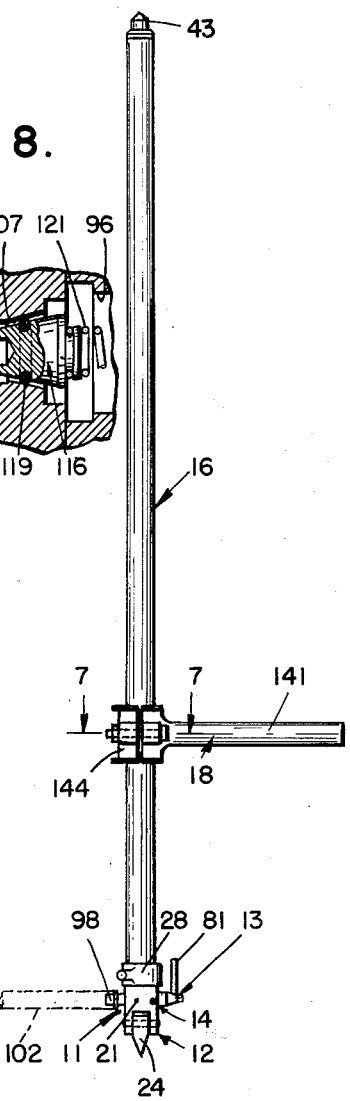
Figure 1 is a side view of a pneumatic column constructed in accordance with the present invention mounting an adjustable tool-supporting arm.

Upon the conclusion of the period of use of the pneumatic column constructed in accordance with the present invention the supported tools are first removed from the arm unit 18. It is then only necessary for the operator, in order to collapse the column, first to force the throttle lock 14 inwardly by a pressure upon the extended end of the bolt stem 127. This movement disengages the bolt head 126 from its locking position with respect to the valve stem 77, whereupon the operator can manually pivot the valve handle in a clockwise direction as viewed in Figure 4. The valve itself is thus moved from its position in Figure 5 to its position in Figure 5A in which, it is seen, the air conduit 89 leading from the cylinder 16 is connected through the circumferential valve passage 79 to the exhaust conduit 91 leading to atmosphere. The escape of the air under pressure enables the piston rod unit 17 to telescope inwardly under the action of gravity to the position illustrated in Figures 1 and 2.

While the particular apparatus herein shown and described in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. In a valve mechanism for pneumatic columns, a body formed with a transverse passage comprising an inlet chamber, a conical valve seat, and a valve stem seat, arranged in alignment and in the order recited, said body also being formed with a second passage transverse to and intersecting said first-mentioned passage, a conical valve seated in said valve seat and exposed to the pressure in said chamber, a stem fixed to said valve extending through said valve stem seat to the exterior and there carrying a handle, a check valve unit closing said inlet chamber, and a valve lock element seated in said second passage and adapted to extend from one end thereof, spring means urging said lock element into engaging relationship with said stem to prevent rotation of said valve, said lock element being adapted to be shifted longitudinally by a manually applied force at its end to disengage said stem to permit its free rotation.

2. In a valve mechanism for pneumatic columns, a body formed with a transverse passage comprising an inlet chamber, a conical valve seat, and a valve stem seat, arranged in alignment and in the order recited, said body also being formed with first, second and third passages intersecting said transverse passage, said first and second passages intersecting said transverse passage at said valve seat and comprising air passages, and said third passage intersecting said transverse passage at said valve stem seat, a rotary conical valve seated in said valve seat to direct air from said inlet chamber into said first passage, to connect said first and second passages, or to seal said passages, a stem fixed to said valve extending through said valve stem seat to the exterior and there carrying a handle, a check valve unit closing said inlet chamber including a second valve movable longitudinally in the axis of rotation of said valve, a coil spring positioned between said valves urging each valve into its seat, a valve lock element seated in said third passage and extended from one end thereof, spring means urging said lock element into engaging relationship with said stem to prevent rotation of said valve, said lock element being adapted to be shifted longitudinally by a manually applied force at its end to disengage said stem to permit its free rotation.

HILMER A. GILLERSTROM.

REFERENCES CITED

The following references are of record in the file of this patent:

UNITED STATES PATENTS

| Number | Name | Date |
|---|---|---|
| 487,064 | Clayton | Nov. 29, 1892 |
| 1,047,499 | Clement | Dec. 17, 1912 |
| 1,231,602 | Hart | July 3, 1917 |
| 1,265,011 | Waterhouse | May 7, 1918 |
| 1,550,550 | McCauley | Aug. 18, 1925 |
| 2,401,856 | Brock | June 11, 1946 |
| 2,461,810 | Curtis | Feb. 15, 1949 |